United States Patent Office 2,867,657
Patented Jan. 6, 1959

2,867,657

PREPARATION OF DIBASIC ACIDS

Charles M. Selwitz, Pittsburgh, Pa., assignor to Gulf Research & Development Company, Pittsburgh, Pa., a corporation of Delaware No Drawing. Application August 29, 1956
Serial No. 606,801

10 Claims. (Cl. 260—537)

This invention relates to a process for the preparation of dibasic carboxylic acids.

Dibasic carboxylic acids are valuable intermediates for the production of chemical products, such as lubricating oils and plasticizers, and accordingly much effort has been expended to produce them from inexpensive charge stocks, such as paraffin wax, by oxidizing the same with nitric acid. However, such processes are not entirely satisfactory, for the oxidized mixture obtained contains a complex mixture of products, including a large amount of monobasic acids and nitrogen-containing acids in addition to the desired dibasic carboxylic acids, and separation of the products becomes a serious problem.

I have found that dibasic acids can effectively and easily be produced by a method which comprises oxidizing an oxygen-containing compound selected from the group consisting of polyalcohols and polyketones containing at least two functional groups and at least one methylene group adjacent at least two of the functional groups, each of said functional groups being separated from another of said functional groups by at least three carbon atoms, in the presence of nitric acid. By "functional" group, I mean the hydroxy group in the case of the alcohol and the carbonyl group in the case of the ketone. Any aliphatic or alicyclic ketone or alcohol meeting the above requirements can be employed in the process to produce dibasic acids. Mixtures of polyalcohols and polyketones can also be used, and, in fact, compounds having both ketonic and hydroxy groups present are considered satisfactory as charge stock. Substituents can be present on the ketones or alcohols provided they are not adversely attacked by the nitric acid oxidant. As examples of substituents which can be present can be mentioned alkyl, aldehyde, carboxylic acid, carboxylic acid ester, carboxylic acid amide, acetal and amine groups. In the event one or more of the substituents on the alcohol or ketone is reacted during the process, the compound resulting in each case will still be a dibasic acid. Best results are obtained when the polyalcohol or polyketone contains about 5 to about 50, preferably about 7 to about 24 number of carbon atoms in the molecule and when the number of functional groups in the molecule is about 2 to about 12, preferably about 4 to about 6. As examples of specific polyketones and polyalcohols which can be employed in the process can be mentioned 5,14-octadecanedione, 1,5-dihydroxy pentane, 1,5-dihydroxy hexane, 2,6-dihydroxy heptane, 2,7,11-trihydroxy dodecane, 2,8,14,20,26-pentahydroxy octacosane, 2,7,12,17,22,27-hexahydroxy octacosane, 2,6,10,14,18,22,26-heptahydroxy octacosane, 2,6-heptanedione, 2,7,11-dodecanetrione, 2,8,14,20,26-octacosane pentaone, 2,7,12,22,27-octacosane hexaone, 2,6,10,14,18,22,26-octacosane heptaone, 2,7-dihydroxy dodecane-11-one, 2,11-dihydroxy dodecane-7-one, 7-hydroxy dodecane-2,11-dione, 2,10,18-trihydroxy octacosane-6,14,22,26-tetraone, 7-ethyl-5,14-octadecanedione, 3-methyl-2,6-heptanedione and 3-propyl-1,5-dihydroxy pentane.

Dilute aqueous solutions of nitric acid having a concentration between about 20 and about 70 percent are preferably used. If desired, nitric acids having concentrations outside the defined ranges can be used but are not generally preferred. Thus, with nitric acid having a concentration below 20 percent, reaction times are exceedingly long, while the use of nitric acid having a concentration in excess of about 70 percent will have a tendency to result in undesirable decomposition and/or degradation products. While the amounts of nitric acid used are not critical and can be varied over a wide range and dibasic acids in accordance with the process herein described will still be obtained, I prefer for best results to employ at least one mol of nitric acid per mol of functional group, and generally about 0.5 to about 3 mols of nitric acid per mol of functional group.

The temperatures required for the reaction are not critical and can be varied over a wide range. In part, the temperature depends upon such variables as the type and structure of the compound being oxidized, the inhibitors which may be present, the catalysts used, etc. In general, a temperature of about 50° to about 250° F., preferably about 120° to about 145° F., is satisfactory. At the higher temperatures, operation under pressure is preferred in order to keep the reactants, particularly nitric acid, in the liquid state. It is desirable, however, to maintain the reaction temperature as low as possible sufficient to permit the reaction to go, for with increased temperature the severity of oxidation and degradation increases. When catalysts such as vanadium oxide are employed, the temperature of the reaction is generally lower than it would be without catalyst. While the temperature of the reaction is preferably maintained at the same level during the course of the reaction, it need not be. Thus, the reaction can be initiated at a selected temperature, say about 75° C., and then conducted at a lower temperature, say about 60° C.

The pressure is not critical, and for ease of operation and considerations of economy, I prefer to carry out the oxidation reaction at atmospheric pressure. When operation under pressure is desired, for example at relatively high temperatures to keep the reactants in the reaction area and preferably in a liquid state, pressures as high as about 150 pounds per square inch, preferably no higher than about 75 pounds per square inch, are satisfactory.

The reaction proceeds rapidly and will take place in a relatively short space of time. Since the reaction is exothermic, however, and removal of heat from the reaction area is of prime consideration to maintain the reaction temperature at a desired level, it is preferred to bring the reactants together in incremental amounts. In general, a reaction time of about one to about 8 hours is sufficient for substantial completion of the reaction. Since the time for the reaction to occur is of such short duration, the times set forth above apply whether a polyketone or polyalcohol is used, since the polyalcohol, when used, is first converted to the corresponding ketone quickly and thereafter to the dibasic acids.

The reaction can be carried out effectively in the absence of catalyst. In the event it is desired to speed up the reaction and/or carry out the reaction at a lower temperature, an oxidation catalyst is preferred. Generally at least about 0.1 gram of catalyst, preferably about one to about 5 grams of catalyst, per total mols of reactants is sufficient to effect the desired improvement. Oxidation catalysts which can be used include vanadium oxide, ammonium vanadate, chromium oxide, manganese dioxide, sodium vanadate, nitrate and chloride salts of iron, cobalt, nickel, niobium and tantalum, etc.

The reaction can be carried out easily by contacting the desired polyketone or polyalcohol with nitric acid at the temperature, pressure and for the length of time, all as defined above. The product obtained, comprising nitric acid and dibasic acids is then treated to remove the nitric acid therefrom, and the residue is thereafter treated by any desired method, preferably in accordance with the method set forth in the article "Chromatographic Separation of Dicarboxylic Acids, $C_4$ to $C_{10}$" by Higuchi, Hill and Korkoran in Analytical Chemistry, volume 24, page 491, 1952, to effect separation of the dibasic acids or by recrystallization or conversion to the methyl ester followed by distillation.

The process of this invention is illustrated below in Example I.

Example I

In a 500 cc. flask were placed 100 milliliters of a 50 percent solution of nitric acid, and 1/10 gram of vanadium oxide, after which the flask was placed in a constant temperature bath maintained at 55° C. While the solution in the flask was stirred, 5.64 grams of 5,14-octadecanedione were added over a period of 4 hours. The solution was heated for an additional two hours at 55° C. after the addition. The solution obtained was neutralized with sodium hydroxide and 577 grams of solution resulted. From the solution was taken a portion weighing 28.32 grams, which was then dried under a lamp over a period of 8 hours. The resulting residue was made slightly acidic by adding a small amount of hydrochloric acid thereto. The product obtained was extracted with ether, and the ether layer was permitted to evaporate, leaving 0.1959 gram of dibasic acids.

The 0.1959 gram of dibasic acids was dissolved in 1.00 gram of tertiary amyl alcohol and diluted to a total weight of 20.87 grams of solution with chloroform. Of this, 7.06 grams was added to a column prepared by packing a homogeneous slurry of 25 grams of Mallinckrodt chromotographic grade silicic acid, 25 grams of one molar (pH 5.40) citrate buffer solution and 200 milliliters of 3 percent n-butyl alcohol-97 percent chloroform into a 20 mm. glass chromatographic tube. After the initial addition, 160 milliliters of 3 to 10 percent n-butyl alcohol in chloroform was added as an eluting solution. Eluate fractions of 5 milliliters were collected and titrated with 0.046 N alcoholic sodium hydroxide. The acids obtained were as follows:

| Acids: | Mol percent |
| --- | --- |
| Sebacic | 25.8 |
| Azaleic | 14.6 |
| Suberic | 24.2 |
| Pimelic | 8.7 |
| Adipic | 7.0 |
| Glutaric | 8.2 |
| Succinic | 5.3 |

The yield of dibasic acids from 5,14-octadecanedione was 57.6 percent.

The above data are based on mols of each acid per mol of the diketone reacted. It is believed that in the oxidation described herein cleavage and oxidation take place between the carbonyl group and the adjacent methylene group, and the relatively large amounts of sebacic, azaleic and suberic acids present would appear to support this belief. Pimelic, adipic, glutaric, and succinic acids are believed to result from oxidative degradation of the principal dibasic carboxylic acids, particularly azaleic acid, more unstable than the others, and its intermediates.

The diketone used in the example was prepared as follows:

To 24.3 g. (1.0 mole) of magnesium covered with 150 cc. of dry ether was added 137 g. (1.0 mole) of n-butyl bromide in 350 cc. of ether over a period of 1½ hours. The reaction product was refluxed for 15 minutes, cooled, and to it was added 100 g. (0.54 mole) of anhydrous cadmium chloride. After the product was refluxed with stirring for one hour, the ether was stripped, 350 ml. of benzene was added, and after the removal of 100 ml. of benzene by distillation, an additional 350 ml. of benzene was added. The mixture was stirred and refluxed for a few minutes to disperse solids, the heat was removed, the mixture was cooled with an ice bath and 100 gms. (0.40 mole) of sebacyl chloride, dissolved in 150 ml. of benzene, was added to the vigorously stirring, refluxing solution over a half hour period. Stirring and refluxing were continued for 2 hours after the addition was complete.

To the product was added 600 ml. of ice water and then a large excess of 20% sulfuric acid. After the addition of benzene and the separation into two phases, the undissolved solids were removed from each by filtration. The benzene was extracted with 200 ml. of water, 200 ml. of 5% sodium carbonate, 200 ml. of water, 100 ml. of saturated sodium chloride solution and then passed through a column of anhydrous sodium sulfate. The aqueous phase was extracted with three 150 ml. portions of benzene, which was added to 200 ml. of a hot benzene solution of the gum in the original flask. This was washed and dried as above and added to the initial solution. After stripping the benzene the diketone was obtained by distillation as 56 gms. (0.20 mole; 50%) of a colorless, hard, waxy solid boiling at 191° C. at 6.7 mm., and melting, after two recrystallizations from hexane, at 75.6–76.0° C.

Example II below shows that the spacing of the functional groups is critical if dibasic carboxylic acids are to be obtained in accordance with the process of the invention.

Example II 2,5-hexanedione was oxidized under conditions substantially similar to those employed in oxidizing 5,14-octadecanedione in Example I above. Thus 0.9026 gram of 2,5-hexanedione was heated for 3 hours at 55.3° C. with 55.3 percent nitric acid and 0.03 gram vanadium oxide. A solid precipitate having a melting point of 127° to 134° C. was obtained. This precipitate was recrystallized to give 0.30 gram of a product having a melting point of 127.8° to 129.6° C., insoluble in water, very slightly soluble in hexane, moderately soluble in carbon tetrachloride and ethanol and very soluble in benzene and chloroform. Analysis indicates the formula of the compound obtained as being $C_6H_4O_3N_2$, not a dibasic carboxylic acid. The solution remaining after removal of the precipitate described above was extracted with ether. The extract was extracted with a base to give 0.29 gram of solid from which two products were obtained, one an isoxazole, the other unknown but not a dibasic carboxylic acid.

Obviously, many modifications and variations of the invention, as hereinafter set forth, can be made without departing from the spirit and scope thereof and therefore only such limitations should be imposed as are indicated in the appended claims.

I claim:

1. A method for producing aliphatic dibasic carboxylic acids which comprises oxidizing an oxygen-containing compound selected from the group consisting of secondary polyalcohols and aliphatic polyketones containing at least two functional groups and at least two methylene groups adjacent at least two of the functional groups, each of said functional groups being separated from another of said functional groups by at least three carbon atoms, with nitric acid.

2. A method for producing aliphatic dibasic carboxylic acids which comprises oxidizing a secondary polyalcohol containing at least two functional groups and at least two methylene groups adjacent at least two of the functional groups, each of said functional groups being separated from another of said functional groups by at least three carbon atoms, with nitric acid.

3. A method for producing aliphatic dibasic carboxylic acids which comprises oxidizing an aliphatic polyketone containing at least two functional groups and at least two methylene groups adjacent at least two of the functional groups, each of said functional groups being separated from another of said functional groups by at least three carbon atoms, with nitric acid.

4. A method for producing aliphatic dibasic carboxylic acids which comprises oxidizing an oxygen-containing compound selected from the group consisting of secondary polyalcohols and aliphatic polyketones containing at least two functional groups and at least two methylene groups adjacent at least two of the functional groups, each of said functional groups being separated from another of said functional groups by at least three carbon atoms, with nitric acid having a concentration between about 20 and about 70 percent.

5. A method for producing aliphatic dibasic carboxylic acids which comprises oxidizing a secondary polyalcohol containing at least two functional groups and at least two methylene groups adjacent at least two of the functional groups, each of said functional groups being separated from another of said functional groups by at least three carbon atoms, with nitric acid having a concentration between about 20 and about 70 percent.

6. A method for producing aliphatic dibasic carboxylic acids which comprises oxidizing an aliphatic polyketone containing at least two functional groups and at least two methylene groups adjacent at least two of the functional groups, each of said functional groups being separated from another of said functional groups by at least three carbon atoms, with nitric acid having a concentration between about 20 and about 70 percent.

7. A method for producing aliphatic dibasic carboxylic acids which comprises oxidizing an oxygen-containing compound selected from the group consisting of secondary polyalcohols and aliphatic polyketones containing at least two functional groups and at least two methylene groups adjacent at least two of the functional groups, each of said functional groups being separated from another of said functional groups by at least three carbon atoms, with nitric acid having a concentration between about 20 and about 70 percent at a temperature of about 50° to about 250° F.

8. A method for producing aliphatic dibasic carboxylic acids which comprises oxidizing a secondary polyalcohol containing at least two functional groups and at least two methylene groups adjacent at least two of the functional groups, each of said functional groups being separated from another of said functional groups by at least three carbon atoms, with nitric acid having a concentration between about 20 and about 70 percent at a temperature of about 50° to about 250° F.

9. A method for producing aliphatic dibasic carboxylic acids which comprises oxidizing an aliphatic polyketone containing at least two functional groups and at least two methylene groups adjacent at least two of the functional groups, each of said functional groups being separated from another of said functional groups by at least three carbon atoms, with nitric acid having a concentration between about 20 and about 70 percent at a temperature of about 50° to about 250° F.

10. A method for producing a mixture comprising azaleic, sebacic and suberic acids which comprises oxidizing 5,14-octadecanedione with nitric acid having a concentration of about 20 to about 70 percent at an elevated temperature of about 50° to about 250° F. and for a time sufficient to obtain such mixture.

References Cited in the file of this patent

UNITED STATES PATENTS 2,700,057    Punderson _____ Jan. 18, 1955

FOREIGN PATENTS 900,092    Germany _____ July 8, 1949

UNITED STATES PATENT OFFICE
CERTIFICATE OF CORRECTION

Patent No. 2,867,657                                    January 6, 1959

Charles M. Selwitz

It is hereby certified that error appears in the printed specification of the above numbered patent requiring correction and that the said Letters Patent should read as corrected below.

Column 1, line 65, for "2,7,12,22,27-octacosane" read -- 2,7,12,17,22, 27-octacosane --.

Signed and sealed this 16th day of June 1959.

(SEAL)
Attest:

KARL H. AXLINE
Attesting Officer

ROBERT C. WATSON
Commissioner of Patents